United States Patent
Hirooka et al.

(10) Patent No.: US 10,432,876 B2
(45) Date of Patent: Oct. 1, 2019

(54) IMAGING APPARATUS CAPABLE OF SWITCHING DISPLAY METHODS

(71) Applicant: Maxell, Ltd., Kyoto (JP)

(72) Inventors: Shinichiro Hirooka, Fujisawa (JP); Hiroshi Chiba, Yokohama (JP)

(73) Assignee: MAXELL, LTD., Kyoto (JP)

( * ) Notice: Subject to any disclaimer, the term of this patent is extended or adjusted under 35 U.S.C. 154(b) by 0 days.

(21) Appl. No.: 15/341,860

(22) Filed: Nov. 2, 2016

(65) Prior Publication Data

US 2017/0150066 A1    May 25, 2017

Related U.S. Application Data

(63) Continuation of application No. 14/093,089, filed on Nov. 29, 2013, now Pat. No. 9,503,648, which is a (Continued)

(30) Foreign Application Priority Data

Dec. 13, 2007 (JP) ................................. 2007-321486

(51) Int. Cl.
*H04N 5/262* (2006.01)
*H04N 13/296* (2018.01)
(Continued)

(52) U.S. Cl.
CPC ........... *H04N 5/2628* (2013.01); *G03B 13/32* (2013.01); *H04N 5/23212* (2013.01);
(Continued)

(58) Field of Classification Search
CPC .. H04N 5/2628; H04N 5/272; H04N 13/0296; H04N 13/0239; H04N 5/23296;
(Continued)

(56) References Cited

U.S. PATENT DOCUMENTS 6,297,846 B1  10/2001  Edanami
6,362,852 B2   3/2002  Ito
(Continued)

FOREIGN PATENT DOCUMENTS

JP    4-354273     12/1992
JP    10-224824 A   8/1998
(Continued)

OTHER PUBLICATIONS

Chinese Office Action received in corresponding Chinese Application No. 201410123302.8 dated Sep. 2, 2016.
(Continued)

*Primary Examiner* — Lin Ye
*Assistant Examiner* — Chan T Nguyen
(74) *Attorney, Agent, or Firm* — Mattingly & Malur, PC

(57) ABSTRACT

An imaging apparatus comprises an image pickup unit, a cutout image generation unit for cutting out a specified area in a pickup image taken by the image pickup unit to generate a cutout image enlarged at a specified magnification, an image display unit for displaying one or both of the pickup image taken by the image pickup unit and the cutout image generated by the cutout image generation unit, a display image control unit for controlling a method of displaying an image the image display unit displays, a manual focus operation unit for the user to control through manual operation the focus position of the image pickup unit, and a manual zoom operation unit for the user to control the zoom magnification of the image pickup unit.

8 Claims, 10 Drawing Sheets

Related U.S. Application Data continuation of application No. 12/331,501, filed on Dec. 10, 2008, now Pat. No. 8,599,244.

(51) Int. Cl.
| | | |
|---|---|---|
| *G03B 13/32* | (2006.01) | |
| *H04N 5/272* | (2006.01) | |
| *H04N 13/10* | (2018.01) | |
| *H04N 5/232* | (2006.01) | |

(52) U.S. Cl.
CPC ..... *H04N 5/23293* (2013.01); *H04N 5/23296* (2013.01); *H04N 5/272* (2013.01); *H04N 13/296* (2018.05); *H04N 13/10* (2018.05)

(58) Field of Classification Search
CPC ........... H04N 5/23293; H04N 5/23212; H04N 13/0003; G03B 13/32
USPC .................................................... 348/240.99
See application file for complete search history.

(56) References Cited

U.S. PATENT DOCUMENTS

| | | | |
|---|---|---|---|
| 6,731,799 | B1 | 5/2004 | Sun et al. |
| 6,900,841 | B1 | 5/2005 | Mihara |
| 7,088,907 | B1 | 8/2006 | Nishijima et al. |
| 7,447,425 | B2 * | 11/2008 | Gong .................. G06T 3/40 348/240.2 |
| 7,492,406 | B2 | 2/2009 | Park et al. |
| 7,512,262 | B2 | 3/2009 | Criminisi et al. |
| 7,783,186 | B2 | 8/2010 | Ishiwata et al. |
| 7,801,331 | B2 | 9/2010 | Hinkel et al. |
| 7,864,240 | B2 | 1/2011 | Ide et al. |
| 7,978,879 | B2 | 7/2011 | Muramatsu |
| 8,599,244 | B2 | 12/2013 | Hirooka et al. |
| 2004/0223191 | A1 | 11/2004 | Murata et al. |
| 2005/0046730 | A1 | 3/2005 | Li |
| 2005/0128333 | A1 * | 6/2005 | Park .................. H04N 5/23293 348/333.12 |
| 2005/0248681 | A1 | 11/2005 | Nozaki et al. |
| 2005/0270399 | A1 | 12/2005 | Kawaguchi et al. |
| 2006/0066744 | A1 | 3/2006 | Stavely et al. |
| 2006/0119714 | A1 | 6/2006 | Tamura et al. |
| 2006/0193509 | A1 | 8/2006 | Criminisi et al. |
| 2007/0035526 | A1 | 2/2007 | Tanenaka et al. |
| 2007/0097460 | A1 | 5/2007 | Kawai |
| 2007/0229672 | A1 * | 10/2007 | Kaneda .............. H04N 5/23209 348/218.1 |
| 2007/0268369 | A1 | 11/2007 | Amano et al. |
| 2007/0291154 | A1 * | 12/2007 | Moon ................. H04N 5/23248 348/333.05 |
| 2008/0074531 | A1 | 3/2008 | Ide et al. |
| 2008/0218613 | A1 | 9/2008 | Janson et al. |
| 2008/0239133 | A1 | 10/2008 | Cazier |
| 2008/0278589 | A1 * | 11/2008 | Thorn ................ H04N 5/23212 348/208.14 |
| 2009/0022427 | A1 | 1/2009 | Park et al. |
| 2009/0122149 | A1 | 5/2009 | Ishii |
| 2009/0122151 | A1 | 5/2009 | Katsuyama |
| 2009/0153649 | A1 | 6/2009 | Hirooka et al. |
| 2010/0149402 | A1 | 6/2010 | Aoki et al. |
| 2010/0188579 | A1 | 7/2010 | Friedman |
| 2010/0220220 | A1 | 9/2010 | Park et al. |
| 2011/0234885 | A1 | 9/2011 | Muramatsu |

FOREIGN PATENT DOCUMENTS

| | | |
|---|---|---|
| JP | 11-196301 | 7/1999 |
| JP | 11-298791 | 10/1999 |
| JP | 11-331649 | * 11/1999 |
| JP | 11-331649 A | 11/1999 |
| JP | 11-341331 | 12/1999 |
| JP | 2001-159730 | 6/2001 |
| JP | 2002-051239 | 2/2002 |
| JP | 2002-152558 | 5/2002 |
| JP | 2003-18434 A | 1/2003 |
| JP | 2003-189136 | 7/2003 |
| JP | 2004-229002 | 8/2004 |
| JP | 2005-78009 | 3/2005 |
| JP | 2005-102175 A | 4/2005 |
| JP | 2005-142660 | 6/2005 |
| JP | 2005-311888 | 11/2005 |
| JP | 2005-341345 | 12/2005 |
| JP | 2006-54536 | 2/2006 |
| JP | 2006-93765 | 4/2006 |
| JP | 2006-197055 | 7/2006 |
| JP | 2006-261711 A | 9/2006 |
| JP | 2006-311082 A | 11/2006 |
| JP | 2006-311578 | 11/2006 |
| JP | 2007-60091 | 3/2007 |
| JP | 2007-151983 | 6/2007 |
| JP | 2007-295529 A | 11/2007 |

OTHER PUBLICATIONS

Chinese Office Action received in corresponding Chinese Application No. 201410123301.3 dated Sep. 5, 2016.
Japanese Office Action received in corresponding Japanese Application No. 2015-235489 dated Sep. 27, 2016.
Office Action issued in Chinese Patent Application No. 201210046911.9 dated Jul. 28, 2014.
Panasonic Operating Instructions, Digital Camera, Model No. DMC-FZ30PP, pp. 1-148.
Panasonic Operating Instructions, Digital Camera, Model No. DMC-FZ50, pp. 1-144.
Canon EOS-1D Mark III Instruction Manual, pp. 1-212.
Canon HR10 Instruction Manual, pp. 1-129.

* cited by examiner (a) PICKUP IMAGE BY LEFT CAMERA (b) PICKUP IMAGE BY RIGHT CAMERA (c) DISPLAY IMAGE

IMAGING APPARATUS CAPABLE OF SWITCHING DISPLAY METHODS

INCORPORATION BY REFERENCE

This application is a continuation application of application Ser. No. 14/093,089 filed Nov. 29, 2013, which is a continuation of application Ser. No. 12/331,501, filed on Dec. 10, 2008, now U.S. Pat. No. 8,599,244, with an issue date of Dec. 3, 2013, which claims the benefit of Japanese Application No. JP 2007-321486 filed on Dec. 13, 2007, in the Japanese Patent Office, the disclosure of which are incorporated herein by reference.

BACKGROUND OF THE INVENTION

The present invention relates to an imaging apparatus with an image pickup unit and an image display unit.

As a background art in the present technical field, one may refer to JP-A-11-341331, for example. The Patent Document aims at "providing an electronic imaging apparatus capable of performing manual focus control speedily and steadily with simplified construction" and discloses a solving technique reading "in an electronic imaging apparatus capable of switching between manual focus (including PF) and auto-focus, a system focus controller 80 controls an electronic zoom circuit 61 during manual focus so that a moving picture of a subject enlarged at a predetermined magnification higher than that during auto-focus may be displayed on a liquid crystal monitor 63. Thus, the enlarged image or video can be displayed on the liquid crystal monitor 63 during manual focus, ensuring that visual recognition of correctness of in-focus state can be facilitated to permit a manual focus adjustment to be made speedily and steadily. And besides, since an enlarged moving picture can be displayed, an in-focus operation can be fulfilled exactly in respect of a moving picture."

SUMMARY OF THE INVENTION

In recent digital video camera and still camera, a liquid crystal display is generally mounted which is used to confirm a subject and an angle of field or view during image pickup. But, as the number of pixels of an image-pickup device increases progressively in compliance with, for example, high definition (High Vision), the number of pixels becomes small with the pixel pitch rendered decreased in a small-size liquid crystal display, giving rise to a problem that details of a subject to be desired for practically photographing is hardly discernible and exact in-focus and exposure states can hardly be confirmed, making it difficult to make adjustments manually.

In the aforementioned JP-A-11-341331, by enlarging a moving picture of a subject at a predetermined magnification and displaying it on the liquid crystal monitor during manual focusing, the user can be allowed to operate manual focus while watching details of the subject. But when, even in the course of manual focusing, the zoom magnification, for example, is desired to be changed, visibility of the entire angle of field is more convenient for operation than watching details of a subject, demonstrating that an image display complying with the contents of operation by the user can promote easy-to-operate capability.

For example, the user's convenience can conceivably be ameliorated by supporting the user in watching more easily a liquid crystal display commensurate with the use purpose either through using the interface for operation of various camera functions in combination with control of a method for displaying an image on the liquid crystal display to enable the user to watch more easily a liquid crystal display meeting use purpose or through combining with the result of image recognition to automatically control the method for displaying an image on the liquid crystal display but, for example, the aforementioned JP-A-11-341331 fails to consider this point.

To eliminate the disadvantages encountered in the background art, the present invention has its object to improve the user's convenience in handling an imaging apparatus and especially, to improve the convenience for the user to use various functions while watching the display monitor.

As an example, the above object can be accomplished by the present invention through inventions as recited in the scope of claims.

Other objects, features and advantages of the invention will become apparent from the following description of the embodiments of the invention taken in conjunction with the accompanying drawings.

DESCRIPTION OF THE INVENTION

Preferred embodiments of this invention will now be described with reference to the accompanying drawings.

Embodiment 1

Figure 1:
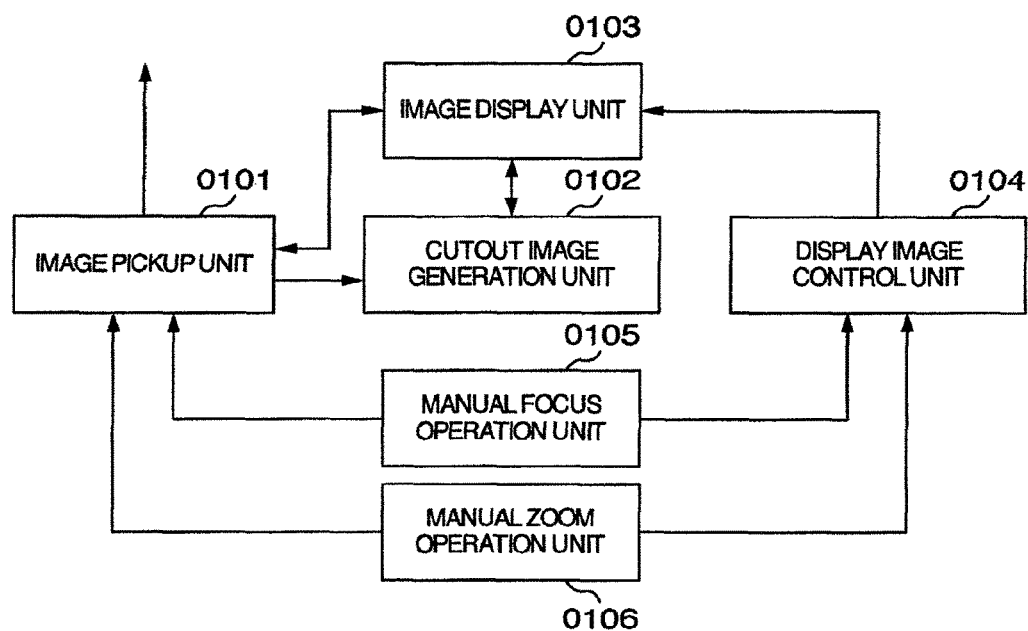
FIG. 1 is a first schematic diagram showing an imaging apparatus according to a first embodiment of the present invention.

Referring first to FIG. 1, there is illustrated a first schematic diagram showing an imaging apparatus according to a first embodiment of the present invention. The imaging apparatus shown in FIG. 1 comprises an image pickup unit 0101, a cutout image generation unit 0102, an image display unit 0103, a display image control unit 0104, a manual focus operation unit 0105 and a manual zoom operation unit 0106.

In the imaging apparatus as shown in FIG. 1, the image pickup unit 0101, in which zoom and focus are variable, includes a group of lenses representing a zoom lens and a focus lens, a shutter, an image-pickup device such as CCD or CMOS, an AGC, an AD, a camera signal processing DSP, a moving picture processing LSI and a timing generator and operates to perform image pickup based on photoelectric conversion and deliver image or video data and image or video data for display which is reduced in accordance with the resolution of a display area of the image display unit 0103. The image data for display may be generated by thinning the original image data at intervals of a predetermined number of pixels or by performing an image reduction process based on a filter operation using the moving picture processing LSI. The image data can be outputted to image recording unit, not shown, so that a moving picture and a still picture may be recorded in a recording medium such as DVD, BD or HDD or alternatively, can be outputted to a TV monitor or PC display, not shown, so as to be displayed thereon. The cutout image generation unit 0102 selects a predetermined area of the image data delivered out of the image pickup unit 0101 and processes an image within the area at coincident or ×1 magnification or at a predetermined enlargement magnification so as to deliver the resultant image as cutout image data. The ×1 magnification herein signifies that the resolution of a picked-up image equals that of an output image to permit delivery dot by dot. The image display unit 0103 is a monitor unit such as a liquid crystal display attached to the imaging apparatus and it responds to information concerning control of an image display method outputted from the display image control unit 0104 to acquire and display the image data for display delivered out of the image pickup unit 0101 or the cutout image data delivered out of the cutout image generation unit 0102. An example of the image display method will be described later with reference to FIG. 2. The display image control unit 0104 acquires from the manual focus operation unit 0105 and manual zoom operation unit. 0106 information concerning focus operation and zoom operation to determine an image display method of the image display unit 0103 on the basis of the captured information and outputs information for controlling the image display method to the image display unit 0103. A method of determining the image display method will be described later with reference to FIG. 3. The manual focus operation unit 0105 having a focus position input interface such as joint dial, right/left button or lever operates an amount of control of the focus position on the basis of input information from the focus position input interface and controls the position of the focus lens of the image pickup unit 0101 on the basis of the control amount. This allows the user to control the focus position manually. The manual focus operation unit 0105 also outputs to the display image control unit 0104 information as to whether the focus operation is in progress. The manual zoom operation unit 0106 having a zoom magnification input interface such as joint dial, right/left button or lever operates an amount of control of the focus position on the basis of input information from the zoom magnification input interface and controls the position of the zoom lens on the basis of the control amount. The manual zoom operation unit 0106 also outputs to the display image control unit 0104 information as to whether the zoom operation is in progress. The operation of information for control of the image display method the display image control unit 0104 performs, the operation of control amount of the focus position the manual focus operation unit 0105 performs and the operation of control amount of the zoom magnification the manual zoom operation unit 0106 performs are typically executed with the help of a microcomputer, camera signal processing DSP and dedicated LSI incorporated in the camera.

Figure 2:
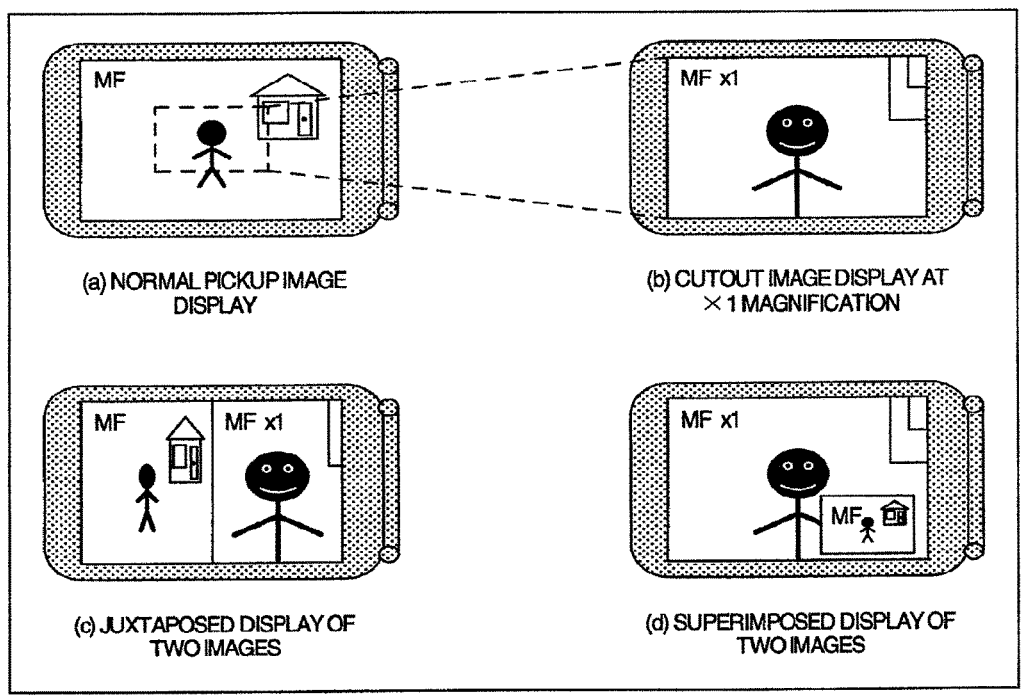
FIG. 2 is a diagram illustrating an example of an image display method in the first embodiment of the invention.

Turning to FIG. 2, an example of an image display method in the first embodiment of the invention is illustrated. For an image display shown in FIG. 2, control of the display method is executed by means of the display image control unit 0104 and an image display is executed by means of the image display unit 0103. In FIG. 2, an ordinary or normal pickup image is displayed on the liquid crystal display as shown at (a), a cutout image is displayed on the liquid crystal display as shown at (b), juxtaposition of the normal pickup image and the cutout image which correspond to horizontal halves of a display area, respectively, is displayed on the liquid crystal display as shown at (c) and superimposition of the normal pickup image and the cutout image which correspond to two divisions of a small area and the other area of the display area, respectively, is displayed on the liquid crystal display as shown at (d). The normal pickup image displayed on the image display unit 0103 as mentioned herein corresponds to reproduction of image data for display which is delivered out of the image pickup unit 0101 while matching with the resolution of the display area of image display unit 0103 and the cutout image displayed on the image display unit 0103 corresponds to reproduction of cutout image data which is delivered out of the cutout image generation unit 0102. It is to be noted that at (a) in FIG. 2, dotted line does not indicate a subject image displayed on an actual image but indicates a cutout area of cutout image for convenience of explanation and the image at (b) in FIG. 2 corresponds to a display at ×1 magnification of the area surrounded by dotted line at (a) in FIG. 2. In this manner, the image is displayed on the liquid crystal display at the same resolution as that of the actually picked up image and therefore, the displayed image is not adversely affected by degradation in picture quality attributable to an image reduction process, thus improving the visual recognition capability. Thanks to this advantage, when the user takes a picture by confirming an image with the help of the liquid crystal display, the auto-focus and auto-exposure conditions near a noticed objective can be confirmed and manual focus operation and exposure operation can be executed more accurately. In this example, the cutout image is displayed at ×1 magnification but the pixel pitch of the liquid crystal display is extremely smaller than that of the normal TV monitor or PC display and hence the display may be enlarged at a predetermined magnification. At that time, if an integer-times enlargement process, for example, is carried out, the picture quality degradation attributable to the interpolation process can be suppressed as far as possible. For the image cutout area determination and the enlargement magnification in the course of the cutout image generation, setting values according to some modes may be set and written in an EEPROM at the time of, for example, shipment to enable the user to input a selected value through an input interface, not shown, while watching the menu screen or an image cutout area may be set freely by the user through the use of a joint dial or a touch panel not shown. In this manner, the user can be allowed to access a display of a noticed area easily at ×1 magnification or at an enlargement magnification to promote the visual recognition capability. Further, by displaying the normal pickup image and the cutout image simultaneously as shown at (c) and (d) in FIG. 2, the user can watch the entire angle of field and details of the subject image at a time. Thus, upon taking a picture, confirmation of the entire composition and confirmation of focus and exposure near the subject can be carried out concurrently. Advantageously, at that time, with the two image displayed in a juxtaposed relationship as shown at (c) in FIG. 2, the two images freed from superimposition can be confirmed and with the two images displayed in a superimposed relationship as shown at (d) in FIG. 2, the two images keeping their aspect ratios unchanged can be confirmed. It will be noticed that in respective drawings in FIG. 2, a letter "MF" or "MF×1" is indicated at the upper left corner of the display image. Then, MF signifies that the present imaging apparatus performs the focus control in the manual focus mode and ×1 signifies that the image is displayed at the coincident magnification. In this manner, by providing a superimposed display of letter information indicative of the state of each function of the imaging apparatus and the image enlargement magnification of the cutout image, the user can conveniently confirm the present use condition at a glance.

Figure 3:
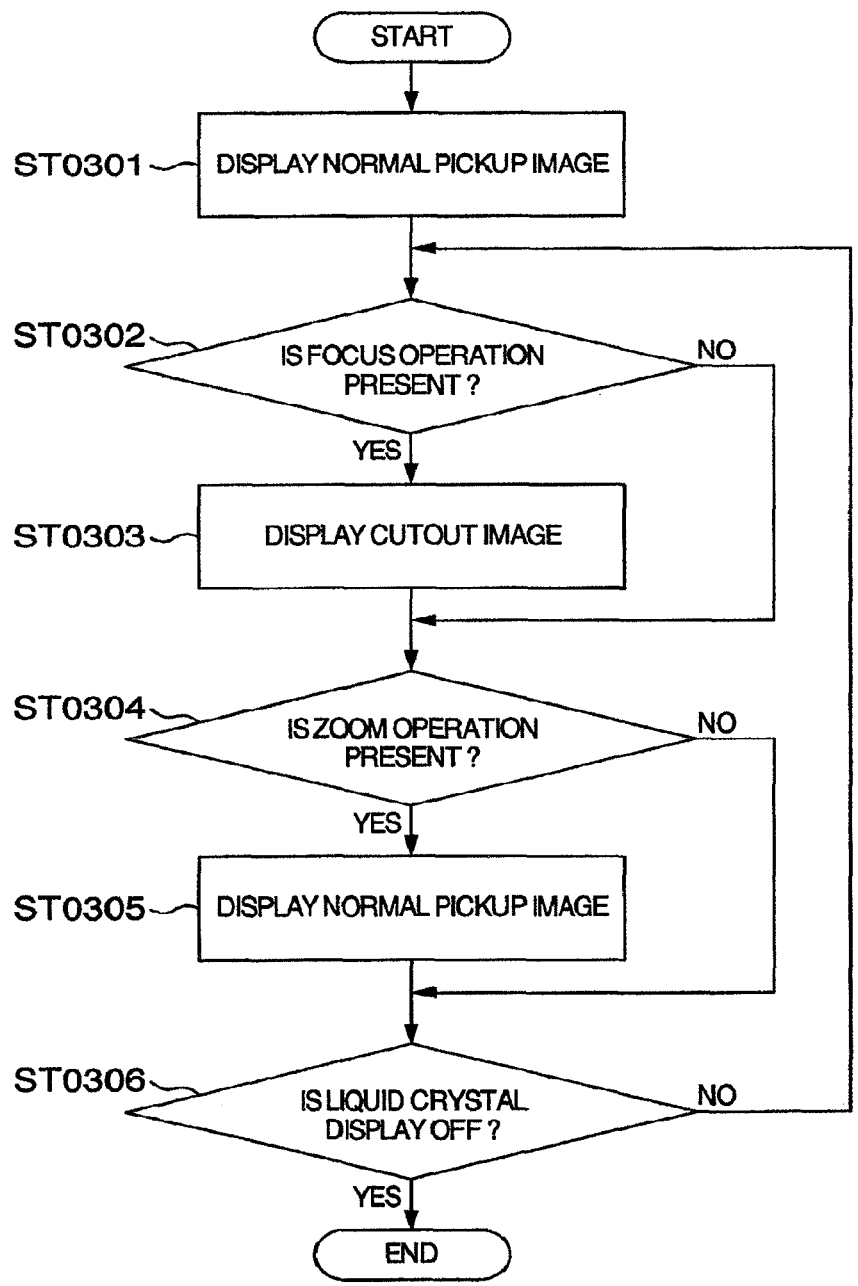
FIG. 3 is a first flowchart showing an example of the control sequence in the image display method in the first embodiment of the invention.

Reference will now be made to FIG. 3 showing an example of the sequence of controlling an image display method in the first embodiment of the invention. The control sequence for the image display method as shown in FIG. 3 is executed by means of the display image control unit 0104.

In the image display method control sequence of FIG. 3, in ST0301, the image display unit 0103 is so controlled as to display a normal pickup image after start of the imaging apparatus. In ST0302, operation information as to whether the user operates manual focus is captured from the manual focus operation unit and the program branches to ST0303 if the operation is detected but to ST0304 if the operation is not detected. In the ST0303, the image display unit 0103 is so controlled as to display a cutout image. In the ST0304, operation information as to whether the user operates manual zoom is captured from the manual zoom operation unit and the program branches to ST0305 if the operation is detected but to ST0306 if the operation is not detected. In the ST0305, the image display unit 0103 is so controlled as to display the normal pickup image. In the ST0306, it is decided whether or not there occurs a condition of ending the display on the liquid crystal display by turning off the imaging apparatus through a power supply switch not shown and in the presence of liquid crystal display ending condition, the sequence is ended but if not, the program repeats itself from the ST0303. As will be seen from the above, the image display method is automatically controlled differently for the manual focus operation and the manual zoom operation, so that the user can conduct an exact focus operation by watching the cutout image during the manual focus operation whereas the user can determine the composition by confirming the entire angle of view while watching the normal pickup image during the manual zoom operation, thereby making it possible to perform an image display complying with the user's use condition. In the present sequence the zoom operation is decided after completion of the focus operation decision but this is a mere example and obviously, the order can be inverted or the two types of decision can be made at a time. Further, the synthesized image as shown at (c) or (d) in FIG. 2 may substitute for the cutout image so as to provide the image to be displayed during the manual focus operation and besides, the user may select in advance methods of displaying images during the manual focus operation and manual zoom operation through a menu screen, for example, thus being allowed to perform an operation while watching a preferable image.

Figure 4:
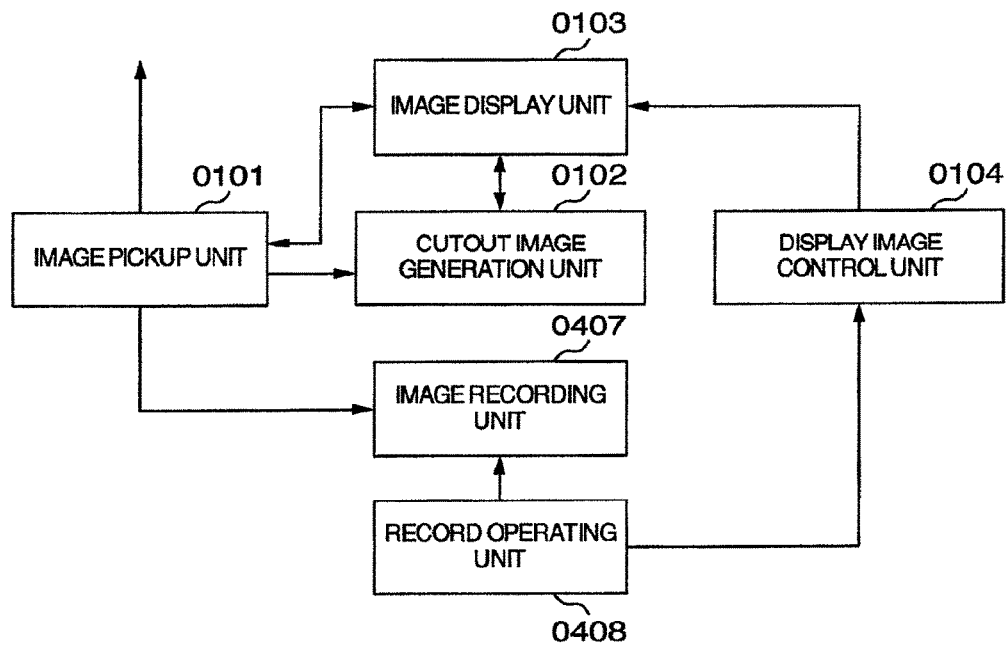
FIG. 4 is a second schematic diagram showing the imaging apparatus in the first embodiment of the invention.

Illustrated in FIG. 4 is a second schematic diagram showing the imaging apparatus in the first embodiment of the invention. There are seen in FIG. 4 the image pickup unit 0101, the cutout image generation unit 0102, the image display unit 0103, the display image control unit 0104, an image recording unit 0407 and an image record operating unit 0408.

In the imaging apparatus as shown in FIG. 4, the image pickup unit 0101, cutout image generation unit 0102 and image display unit 0103 operate similarly to those in the imaging apparatus exemplified in FIG. 1. The display image control unit 0104 acquires information concerning image recording operation from the image record operating unit 0408 and on the basis of the captured information, determines an image display method of the image display unit 0103 to output control information for the method to the image display unit 0103. A method for determination of the image display method will be described later with reference to FIG. 5. The image recording unit 0407 includes a moving picture processing LSI and applies a moving picture compression process to image data delivered out of the image pickup unit 0101 and records compressed image data on a recording medium such as DVD, BD or HDD. The record operating unit 0408 includes a record operation input interface such as push button and on the basis of input information from the record operation input interface, controls timings of causing the image recording unit 0407 to start, pause and stop. The record operating unit 0408 also delivers to the display image control unit 0104 information as to whether the recording operation is in progress. The timings of the recording the record operating unit 0408 conducts are typically controlled by the microcomputer or the camera signal processing DSP incorporated in the camera.

Figure 5:
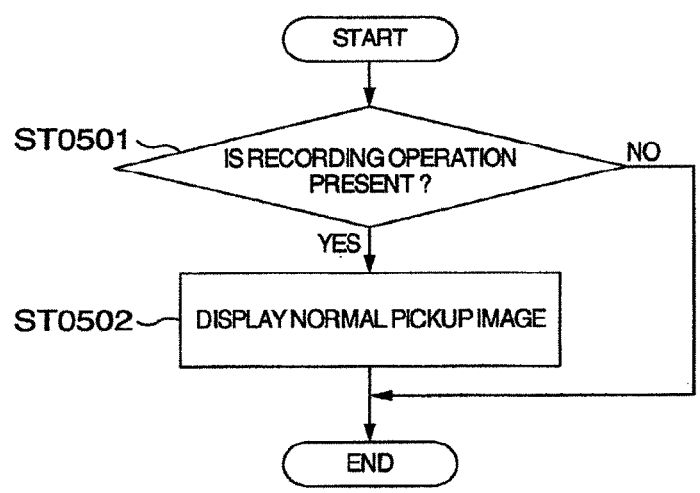
FIG. 5 is a second flow chart showing an example of the control sequence in the image display method in the first embodiment of the invention.

A second flowchart of another example of the sequence of controlling the image display method in the first embodiment of the invention is shown in FIG. 5. The control sequence for the image display method of FIG. 5 is executed by the display image control unit 0104.

Referring to the sequence of controlling the image display method, in ST0501, operation information as to whether a user operation for starting image recording is present is acquired from the record operating unit and the program proceeds to ST0502 if the operation is detected but if not, the process ends. In the ST0502, the image display unit 0103 is so controlled as to display a normal pickup image irrespective of the image display method at present. This is because in consideration of the fact that the user manually controls the focus and exposure infrequently in the course of taking a picture actually, the display method is switched automatically to the normal pickup image at timing of start of recording even when the image display unit 0103 is displaying a cutout image, with the result that the user can confirm the entire angle of view, being permitted to conduct an easy-to-handle operation. In connection with the image to be displayed upon recording, the synthesized image as shown at (c) or (d) in FIG. 2 may substitute for the normal pickup image, thus ensuring that for the sake of improving the operability, the user can be allowed to select in advance through the menu screen, for example, the method of displaying an image to be displayed and the determination as to whether the present control is to proceed during image recording.

A third schematic diagram of the imaging apparatus in the first embodiment of the invention will now be described by making reference to FIG. 6. Illustrated in FIG. 6 are the image pickup unit 0101, the cutout image generation unit 0102, the image display unit 0103, the display image control unit 0104, the manual focus operation unit 0105, an auto-focus control unit 0609 and a focus control selecting unit 0610.

Figure 6:
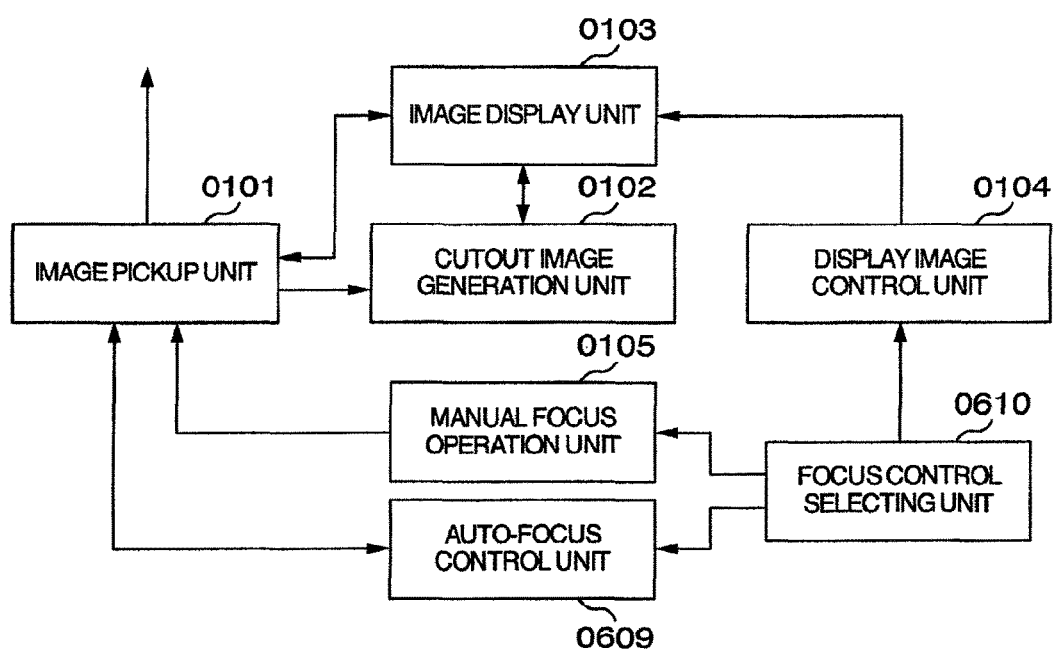
FIG. 6 is a third schematic diagram showing the imaging apparatus in the first embodiment of the invention.

In the imaging apparatus as shown in FIG. 6, the image pickup unit 0101, cutout image generation unit 0102 and image display unit 0103 and manual focus operation unit 0105 operate similarly to those in the imaging apparatus exemplified in FIG. 1. The display image control unit 0104 acquires information concerning focus control selection operation from the focus control selection operation unit 0610 and on the basis of the acquired information, determines an image display method of the image display unit 0103 to output control information for the method to the image display unit 0103. A method for determination of the image display method and its display contents will be described later with reference to FIG. 7. On the basis of image data delivered out of the image pickup unit 0101, the auto-focus control unit 0609 operates a focus position suitable for in-focus and on the basis of the operation result, controls the position of the focus lens of image pickup unit 0101. The focus control selection operation unit 0610 having a focus control selection operation input interface such as a push button performs switching, on the basis of input information from the focus control selection operation input interface, as to which one of the manual focus operation unit 0105 and the auto-focus control unit 0609 performs the control of the focus position in the image pickup unit 0101. The focus control selection operation unit 0610 delivers the input information of the focus control selection operation input interface also to the display image control unit 0104. The in-focus focal position operating process the auto-focus control unit 0609 conducts is typically executed by the microcomputer or the camera signal processing DSP incorporated in the camera.

Figure 7:
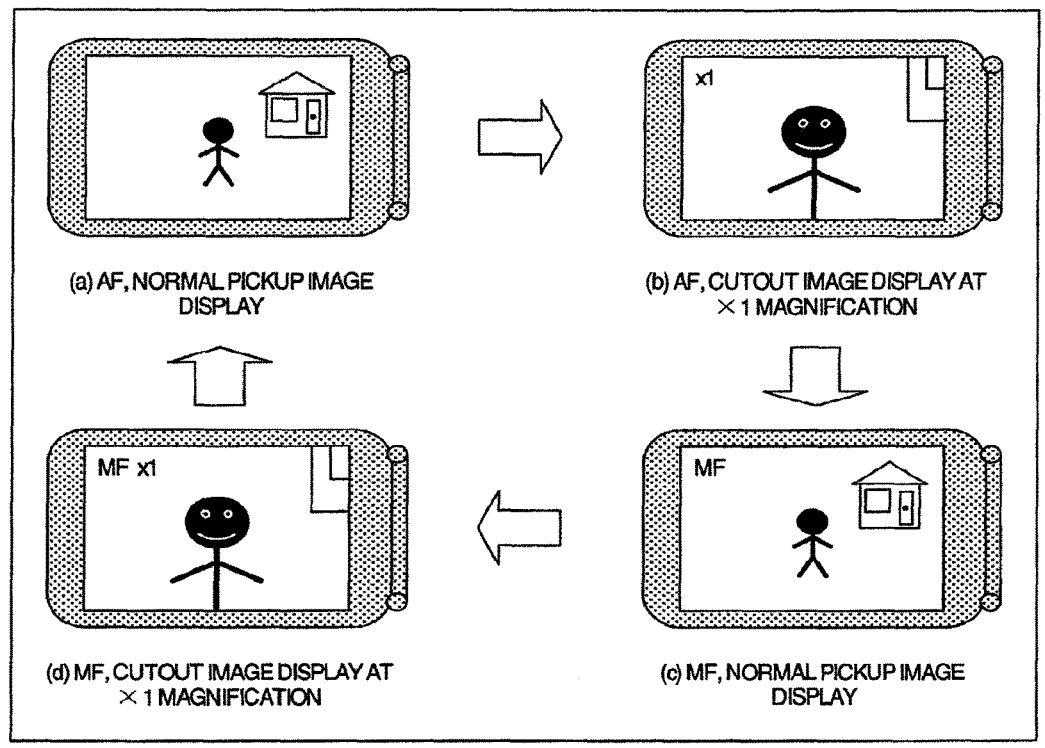
FIG. 7 is a diagram illustrating an example of control of switching the image display method in the first embodiment of the invention.

An example of the control of switching the image display method in the first embodiment of the invention is illustrated in FIG. 7. In FIG. 7, a normal pickup image is displayed on the liquid crystal display as shown at (a) when the focus control method is for auto-focus and the image display method is for normal image, a cutout image is displayed on the liquid crystal display as shown at (b) when the focus control method is for auto-focus and the image display method is for cutout image, a normal pickup image is displayed on the liquid crystal display as shown at (c) when the focus control method is for manual focus and the image display method is for normal image and a cutout image is displayed on the liquid crystal display as shown at (d) when the focus control method is for manual focus and the image display method is for cutout image. Each time that the focus control selection operating unit 0610 receives one input, the display image control unit 0104 switches the focus control method and the image display method in order of sections (a), (b), (c) and (d) in FIG. 7. Thus, the user can perform switching between the auto-focus and the manual focus and switching between the normal pickup image display and the cutout image display by simply recognizing how many times the user depresses the push button, for example, and improvements in operability can be realized. Operation by the push button is exemplified herein but the control may be achieved by operating, for example, a rotary dial or a touch panel.

The imaging apparatus according to the first embodiment has been set forth by way of three types of constructions for clear and better understanding of the individual advantages the respective types have and obviously, a single imaging apparatus of the invention can be provided with all of three types of constructions and functions. In such a case, all modes of control of the image display method including switchover of the image display method between the manual focus operation and the manual zoom operation, switchover thereof at the timing of starting record and switching the image display method through operation of the push button may be rendered effective or alternatively, the user may select a necessary control mode from the menu screen.

In the present construction, the image display unit 0103 displays one of the pickup image and the cutout image delivered out of the image pickup unit 0101 and cutout image generation unit 0102, respectively, or a synthesis image of both the images but when the imaging apparatus has a frame memory adapted to store one screen of image data picked up by the image pickup unit 0101 and the image display unit 0103 controls how to read data of individual pixels of the frame memory, equivalently meritorious effect can be materialized. For example, when generating a display image as shown at (c) in FIG. 2, one line of a picked up image the image pickup unit 0101 outputs is first read at intervals of a constant number of pixels and subsequently, one line of data inside a cutout area is read at intervals of a constant number of pixels. Then, this operation repeats itself by the number of lines of the liquid crystal display. As will be seen from the above, the method of generating a display image by controlling the manner of reading the frame memory is complicated in control but is advantageous in that cutout image data need not be generated separately.

As described above, according to the present embodiment, in the imaging apparatus having the display monitor such as a liquid crystal display, the visual recognition capability can be improved and the operability when the focusing and exposure are conducted manually can also be improved by displaying part of an image at ×1 magnification or at an enlargement magnification and besides, the user's convenience in operation can be improved by switching the display method in accordance with the operation by the user.

Embodiment 2

Figure 8:
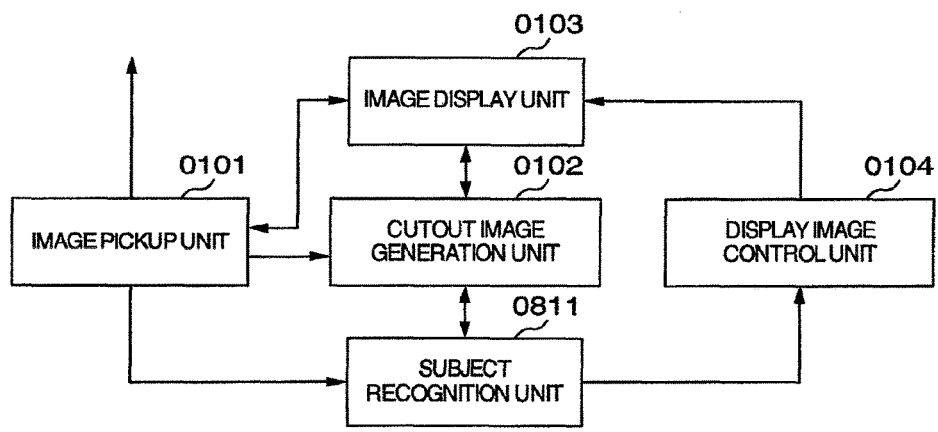
FIG. 8 is a schematic diagram showing an imaging apparatus according to a second embodiment of the invention.

Referring to FIG. 8, an imaging apparatus according to a second embodiment of the present invention is illustrated schematically. In FIG. 8, the imaging apparatus comprises an image pickup unit 0101, a cutout image generation unit 0102, an image display unit 0103, a display image control unit 0104 and a subject recognition unit 0811.

In the imaging apparatus as shown in FIG. 8, the image pickup unit 0101, in which zoom and focus are variable, includes a group of lenses representing a zoom lens and a focus lens, a shutter, an image-pickup device such as CCD or CMOS, an AGC, an AD, a camera signal processing DSP, a moving picture processing LSI and a timing generator and operates to perform image pickup based on photoelectric conversion and deliver image data and image data for display which is reduced in accordance with the resolution of a display area of the image display unit 0103. The image data for display may be generated by thinning the original image data at intervals of a predetermined number of pixels or by performing an image reduction process based on a filter operation using the moving picture processing LSI. The image data is delivered to an image recording unit, not shown, so that a moving picture and a still picture can be recorded on a recording medium such as DVD, BD or HDD or alternatively, can be outputted to a TV monitor or PC display, not shown, so as to be displayed thereon. The cutout image generation unit 0102 selects a predetermined area of the image data delivered out of the image pickup unit 0101 and processes an image within the area at ×1 magnification or at a predetermined enlargement magnification so as to deliver the resultant image as cutout image data. The image display unit 0103 is a monitor unit such as a liquid crystal display attached to the imaging apparatus and it responds to information concerning control of an image display method outputted from the display image control unit 0104 to acquire and display image data for display delivered out of the image pickup unit 0101 or cutout image data delivered out of the cutout image generation unit 0102. The display image control unit 0104 acquires from the subject recognition unit 0811 a result of subject recognition, determines an image display method of the image display unit 0103 on the basis of the captured result and outputs information for control of the image display method to the image display unit 0103. The subject recognition unit 0811 performs detection and chase of the subject on the basis of image data delivered out of the image pickup unit 0101 through an image recognition process and outputs a result of subject recognition to the display image control unit 0104. Also, the subject recognition unit 0811 determines the position and range of a cutout area by the cutout image generation unit 0102 on the basis of the result of subject recognition and outputs it to the cutout image generation unit 0102. The subject signifies herein a noticed objective such as a characteristic area, for example, a face of a person or a moving body and for detection of the subject, the existing face detection technique or the moving object detection technique may be used. For chase of the subject, the subject may be detected frame by frame and detection results are mutually correlated or alternatively, the existing chase technique typified by optical flow or inter-frame difference may be employed. The image recognition process the subject recognition unit 0811 conducts is typically executed by the microcomputer, camera signal processing DSP or the dedicated LSI incorporated in the camera.

Figure 9:
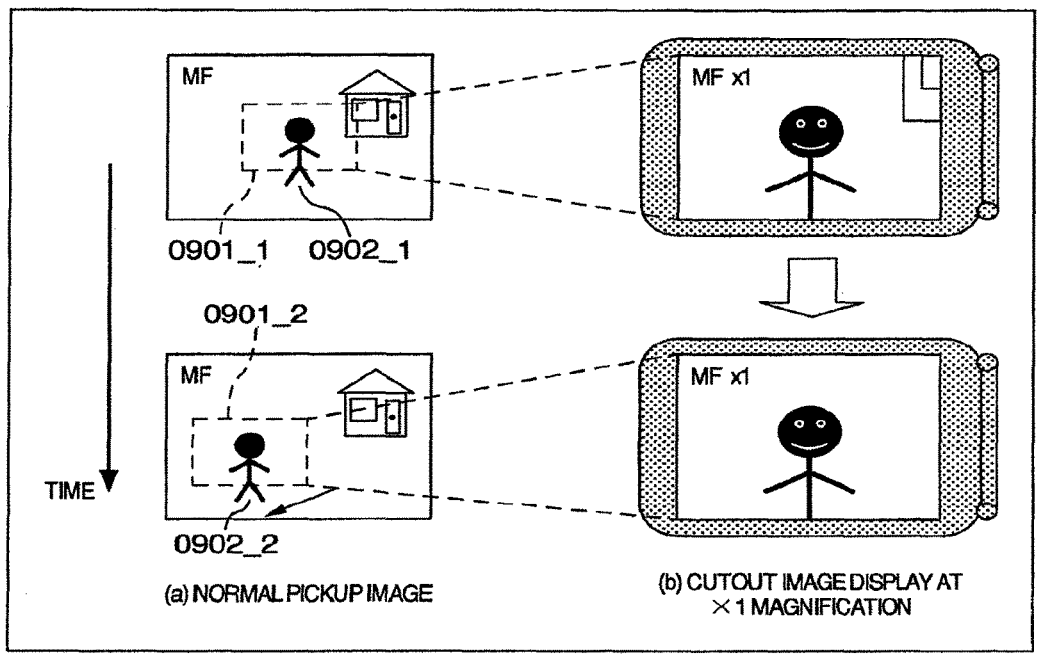
FIG. 9 is a diagram illustrating an example of a method of controlling a cutoff area of a cutoff image in the second embodiment of the invention.

Illustrated in FIG. 9 is an example of a method of controlling a cutout area of a cutout image in the second embodiment of the invention. In FIG. 9, picked up images displayed on the liquid crystal display before and after a lapse of constant frame are shown at (a) and corresponding cutout images displayed on the liquid crystal display before and after the constant frame lapse are shown at (b). In the drawings, 0901_1 designates a cutout area before the constant frame lapse, 0901_2 a cutout area after the constant frame lapse, 0902_1 a subject person before the constant frame lapse and 0902_2 a subject person after the constant frame lapse. Dotted line and arrow indicated at (a) in FIG. 9 are displayed for convenience of explanation and are not subject images being actually picked up. Operation in a method for controlling a cutout area of a cutout image will be described by using FIG. 9. It is now assumed that before the constant frame lapse, the user operates to display the area 0901_1 nearby the subject person 0902_1 at ×1 magnification on the liquid crystal display. At that time, the subject recognition unit 0811 detects the subject person 0902_1 contained in the cutout area 09011_1. When the subject person has moved in arrow direction in the drawing at the termination of the constant frame lapse, the subject recognition unit conducting a process of chasing the subject person on the basis of image recognition detects the subject person 0902_2 after the movement and controllably causes the cutout area to shift on the basis of an amount of movement and a direction of movement. The control information is outputted to the cutout image generation unit 0102 to cause it to change the cutout area on the basis of the control information, so that the position of the subject can be so controlled as to remain throughout the movement as shown at (b) in FIG. 9. Thus, even when the subject at which the user wants to set focus and exposure moves, the area to be displayed at ×1 or enlargement magnification can be chased automatically and accurate in-focus and exposure conditions can be realized easily. In this example, the explanation is given of the single subject but in case a plurality of subjects are present, the user may select a noticed subject with the help of a touch panel not shown, the subject recognition unit 0811 may detect factors such as positions and area ratios of the individual subjects inside the cutout areas and may weight the factors, respectively, in order that the noticed subject can be determined. Further, if a subject moves forwardly or backwardly and the area of the subject in a cutout image changes, the magnification of enlargement of the cutout image may be controlled on the basis of an area of the subject to enable the subject to be displayed constantly in substantially the same size. In conducting the subject chase using the image recognition, the chase process may be executed only within a cutout area when the moving speed of the subject is low, thereby reducing the process cost. If the moving speed of the subject is so high that the subject departs from an angle of field of the cutout area, the chase process is carried out at the entire field angle for a normal pickup image in order that the subject being outside the field angle of the cutout area can be chased.

Figure 10:
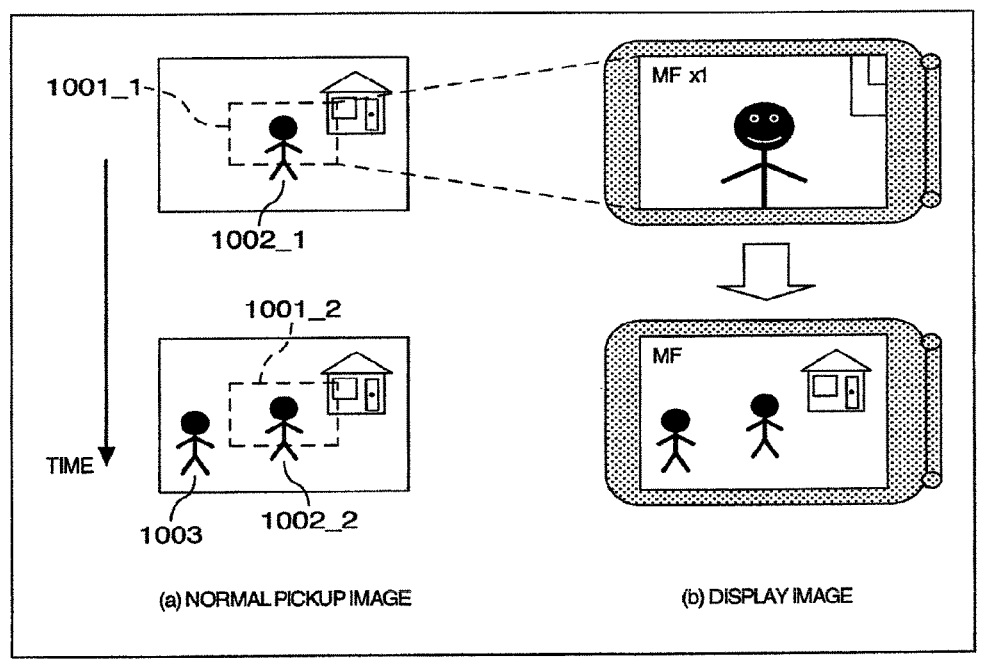
FIG. 10 is a diagram illustrating an example of a method of controlling an image display method in the second embodiment of the invention.

Illustrated in FIG. 10 is an example of a method of controlling an image display method in the second embodiment of the invention. In FIG. 10, picked up images displayed on the liquid crystal display before and after a lapse of constant frame are shown at (a) and corresponding cutout images displayed on the liquid crystal display before and after the constant frame lapse are shown at (b). In the drawings, 1001_1 designates a cutout area before the constant frame lapse, 1001_2 a cutout area after the constant frame lapse, 1002_1 a first subject person before the constant frame lapse, 1002-2 the first subject person after the constant frame lapse and 1003 a second subject person after the constant frame lapse. Dotted line indicated at (a) in FIG. 10 is displayed for convenience of explanation and is not a subject image being actually picked up. Operation in a method for controlling an image display method will be described by using FIG. 10. It is now assumed that before the constant frame lapse, the user operates to display the area 1001_1 nearby the first subject person 1002_1 at ×1 magnification on the liquid crystal display. The subject recognition unit 0811 conducts the subject detection process even for an object outside the cutout area 1001_1 every frame or at intervals of constant frames. When the subject recognition unit 0811 detects the second subject 1003 outside the cutout are 1001_2 after the constant frame lapse, it outputs a detection result to the display image control unit 0104. Receiving the detection result, the display image control unit 0104 controllably switches the display image to a normal pickup image as shown at (b) in FIG. 10. Thus, even when the user is operating by confirming only the cutout image, the screen can be switched automatically so as to permit the entire field angle to be seen as the new subject comes into a field angle at which image pickup is being in progress and the subject can be confirmed and the composition thereof can be grasped easily without missing the subject coming into the field angle.

As described above, according to the present embodiment, in the imaging apparatus having the display monitor such as a liquid crystal display, the visual recognition capability can be improved and the operability when the focusing and exposure are conducted manually can be improved by displaying part of an image at ×1 magnification or at an enlargement magnification and in addition, the user's convenience in operation can be improved by changing the position and size of the area to be displayed at the enlargement magnification and by switching the image display method automatically through the image recognition.

Embodiment 3

Figure 11:
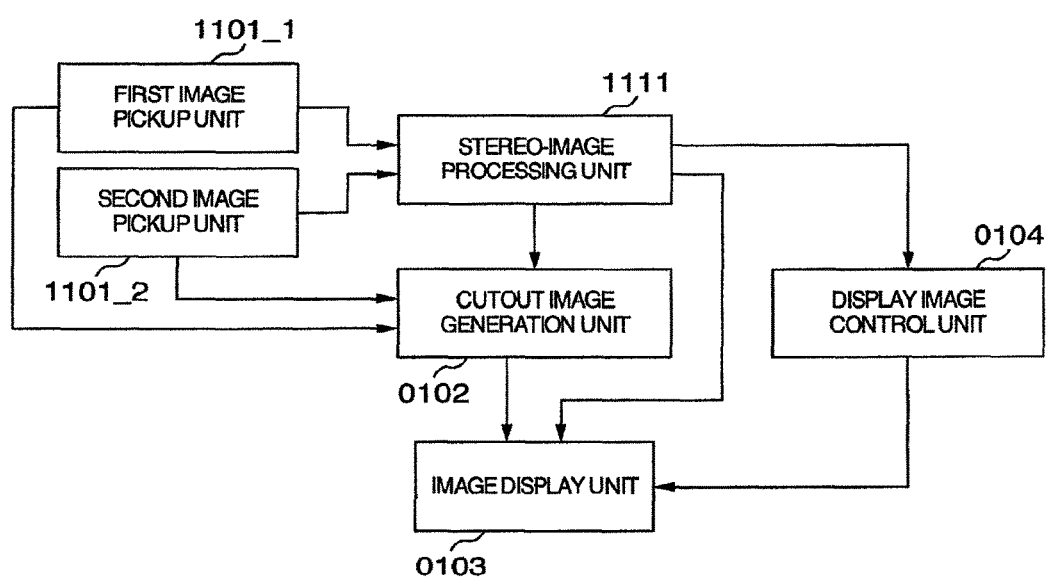
FIG. 11 is a schematic diagram showing an imaging apparatus according to a third embodiment of the invention.

Referring to FIG. 11, an imaging apparatus according to a third embodiment of the present invention is illustrated schematically. In FIG. 11, the imaging apparatus comprises a first image pickup unit 1101_1, a second image pickup unit 1101_2, a cutout image generation unit 0102, an image display unit 0103, a display image control unit 0104 and a stereo-image processing unit 1111.

In the imaging apparatus as shown in FIG. 11, each of the first and second image pickup units 1101_1 and 1101_2 in which zoom and focus are variable, includes a group of lenses representing a zoom lens and a focus lens, a shutter, an image-pickup device such as CCD or CMOS, an AGC, an AD, a camera signal processing DSP, a moving picture processing LSI and a timing generator and operates to perform image pickup based on photoelectric conversion and deliver image data. The stereo-image processing unit 1111 conducts a stereo-image process by using image data delivered out of each of the first and second image pickup units 1101_1 and 1101_2 to perform three-dimensional measurement of a subject and delivers three-dimensional information including parallax information, distance information, three-dimensional position information and evaluation values indicative of reliability of the three-dimensional measurement. The stereo-image processing unit also reduces image data representing that from one of the first and second image pickup units 1101_1 and 1101_2 or synthetic image data of both data of the first and second image pickup units in accordance with the resolution of a display area of the image display unit 0103 and outputs the reduced data as stereo-image data for display. The stereo-image data for display may be generated by thinning the original image data at intervals of predetermined pixels or by performing an image reduction process based on a filter operation using the moving picture processing LSI. The stereo-image process includes a pre-process typified by a calibration process such as lens distortion correction process and parallelism process and a low-pass filter process for noise elimination as well, a post-process typified by a process for operating a feature quantity, for example, edge detection, a stereo-matching process for making the correspondence between stereo-images by using various correlation processes inclusive of normalized mutual correlation and block matching, for example, absolute value sum and a space-sweep process so as to acquire parallax information and a process for removing a singular point through rank filter process and labeling as well and besides, a distance calculation process for operating distance information by using the parallax information, thereby ensuring that information obtained on the way of process, for example, the result of correspondence when the stereo-matching process is carried out can be outputted. The cutout image generation unit 0102 selects a predetermined area of image data delivered out of either the first image pickup unit 1101_1 or second image pickup unit 1101_2 and delivers, as cutout image data, an image inside the area at ×1 magnification or at an enlargement magnification. The image cutout area may be inputted from an interface not shown or may be determined on the basis of various operation results delivered out of the stereo-image processing unit 1111. An example of a method of determining the cutout area will be described later with reference to FIG. 12. Alternatively, a first cutout image generated from the image data delivered out of the first image pickup unit 1101_1 may be synthesized with a second cutout image 1101_1 generated from the image data delivered out of the second image pickup unit 1101_2 to produce a stereo-cutout image which in turn is outputted. The image display unit 0103 is a monitor unit such as a liquid crystal display attached to the imaging apparatus and it responds to information concerning control of a image display method outputted from the display image control unit 0104 to acquire and display image data for display delivered out of the stereo-image processing unit 1111 or cutout image data or stereo-cutout image data delivered out of the cutout image generation unit 0102. The display image control unit 0104 acquires input information from an interface, not shown, and various operation results delivered out of the stereo-image processing unit 1111 and determines an image display method of the image display unit 0103 on the basis of the acquired information and results and outputs information for controlling the image display method to the image display unit 0103. The stereo-image process the stereo-image processing unit 1111 conducts is typically executed by the microcomputer, DSP or image processing LSI incorporated in the camera. In the present construction, the two image-pickup units are used but the number of the image pickup units is not limitative and three or more plural image pickup units located at different positions may alternatively be employed. In addition, a stereo-image pickup unit having a mirror and a prism may be employed, permitting a single image pickup unit with a single image pickup device to be used.

Figure 12:
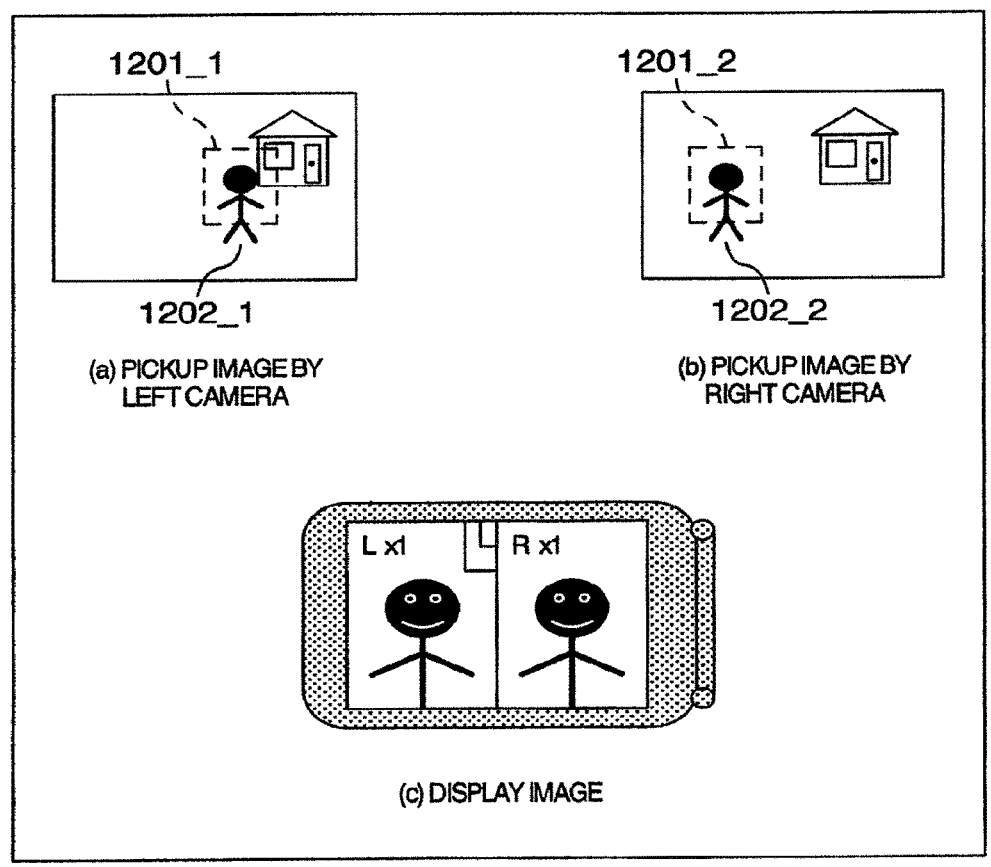
FIG. 12 is a diagram illustrating an example of an image display method in the third embodiment of the invention.

Turning to FIG. 12, an example of an image display method in the third embodiment of the invention is illustrated. In FIG. 12, a normal image picked up by a left one of the two cameras located on right and left is displayed on the liquid crystal display as shown at (a), a normal image picked up by a right camera is displayed on the liquid crystal display as shown at (b) and a superimposed image of cutout images by the right and left cameras is displayed on the liquid crystal display as shown at (c). In the drawings, 1201_1 designates a cutout area in the pickup image by the left camera, 1201_2 a cutout area in the pickup image by the right camera, 1202_1 a subject person in the pickup image by the left camera and 1202_2 a subject person in the pickup image by the right camera. Dotted lines indicated at (a) and (b) in FIG. 12 are displayed for convenience of explanation and are not subject images being actually picked up. Operation in a method for controlling an image display method will be described by using FIG. 12. In the pickup image by the left camera as shown at (a) in FIG. 12, the cutout image generation unit 0102 cuts out the area 1201_1 nearby the subject person 1202_1. For determination of the image cutout area, setting values according to some modes may be set and written in an EEPROM at the time of, for example, shipment to enable the user to input a selected value through an input interface, not shown, while watching the menu screen or an image cutout area may be set freely by the user through the use of a joint dial or a touch panel not shown. The stereo-image processing unit 1111 detects a subject person 1202_2 taken by the right camera corresponding to a subject person 1202_1 taken by the left camera through a stereo-matching process and outputs a detection result to the cutout image generation unit 0102. In the stereo-matching process, the area 1201_1, for example, may be provided as a template and detection may proceed through matching process on the area basis or feature points inside the area 1201_1 may be detected so that points corresponding to the individual feature points can be detected through a matching process on the feature point basis and weighted results can be unified to determine a corresponding area. The cutout image generation unit 0102 determines the cutout area 1201_2 in the pickup image by the right camera in such a way that the position of the subject person 1202_1 in the cutout image by the left camera substantially coincides with the position of the subject person 1202_2 in the cutout image by the right camera. By synthesizing the cutout images taken by the left and right cameras, the cutout image generation unit 0102 can display neighborhoods of subjects of the respective cameras at ×1 magnification or at an enlargement magnification as shown at (c) in FIG. 12. In this example, the stereo-matching process is conducted with the pickup image by the right camera referenced to the left camera but conversely, it may be conducted with the pickup image by the left camera referenced to the right camera. By making a juxtaposed display of neighborhoods of the corresponding subjects by the left and right cameras at ×1 magnification or at an enlargement magnification, the user can be allowed to perform focus operation and exposure operation while confirming conditions of focus and exposure for the pickup images by the left and right cameras at a time. Accordingly, even in case focus and exposure conditions for the same subject delicately slightly differ between the cameras because of a difference in angle of field between the left and right cameras, the focus positions can be unified accurately and besides the exposure conditions can also be unified accurately between the cameras to improve the accuracies in stereo-matching process and three-dimensional measurement in the stereo-image process.

As described above, according to the present embodiment, in the imaging apparatus having the display monitor such as a liquid crystal display and the plurality of image pickup units, the neighborhoods of the subjects corresponding to each other between the image pickup units can be displayed at ×1 magnification or at an enlargement magnification and visual recognition capability by the user can be improved during focus and exposure matching operation and therefore improvements in operation accuracies in the stereo-image process can be assisted.

It should be understood that the present invention is not limited to the foregoing embodiments and can include various modifications and alterations. For example, the foregoing embodiments have been described in detail for clear and better understanding of the invention and this invention is not always limited to include all constructions set forth so far. Further, part of construction of an embodiment can be replaced with construction of another embodiment or the construction of an embodiment can be added to the construction of another embodiment.

The present invention has been described by way of preferred embodiments of thereof.

According to this invention, in a video camera or still camera having a display monitor such as a liquid crystal display, an image on the display monitor can be switched over through simplified operation or through automatic control to improve the convenience capability when the user uses various functions while watching the display monitor.

The present invention can be utilized for a consumer use camera, a monitoring camera and a stereoscopic camera.

According to this invention, the user's convenience in operating the imaging apparatus can be improved. Especially, the convenience can be improved for the user to use various functions while watching the display monitor.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An imaging apparatus comprising:
   an imager configured to perform image pickup and obtain a pickup image;
   an image display configured to display the pickup image;
   a touch panel configured to enable a user to select a subject included in the pickup image displayed on the image display;
   a controller configured to control the image display to display the pickup image or a superimposed image including the pickup image and a cutout image which is cut out and generated for displaying a part of an area of the pickup image with magnification;
   an operation input interface configured to switch an image displayed on the image display from the pickup image to the superimposed image in accordance with an operation of a user; and
   a recording button configured to operate a start and an end of a recording of the pickup image obtained by the imager when a moving picture is recorded,
   wherein the controller is further configured to:
   when the subject included in the pickup image displayed on the image display is selected via the touch panel, recognize and chase the selected subject in the pickup image,
   in a case that a position of the selected subject that is recognized and chased in the pickup image is changed, automatically change the area which is cut out as the cutout image from the pickup image in accordance with the changed position of the subject selected in the pickup image, and
   when the superimposed image including the pickup image and the cutout image including the selected subject is displayed on the image display in accordance with the operation via the operation input interface and an operation of the start of the recording for recording the moving picture by the recording button is detected, switch from displaying the superimposed image to displaying the pickup image on the image display.

2. The imaging apparatus according to claim 1, wherein the operation input interface is configured to receive a manual focus operation as the operation of the user, and
   wherein the controller is further configured to, when an input of the manual focus operation is detected, control a focus position and switches from displaying the pickup image to displaying the superimposed image on the image display.

3. The imaging apparatus according to claim 1, wherein the controller is further configured to, when recording the pickup image as the moving picture, display the pickup image on the image display without switching to displaying the superimposed image during the recording when the operation is input via the operation input interface.

4. The imaging apparatus according to claim 1, wherein the controller is further configured to operate in a control mode to recognize and chase a face of a person as the selected subject included in the pickup image displayed on the image display,
   wherein the controller is further configured, in the control mode, to:

in a case that a position of the face of the person that is recognized and chased in the pickup image is changed, automatically change the area which is cut out from the pickup image as the cutout image in accordance with the changed position of the face of the person in the pickup image, and when the superimposed image including the pickup image and the cutout image including the face of the person is displayed on the image display in accordance with the operation via the operation input interface and the operation of the start of the recording for recording the moving picture by the recording button is detected, switch from displaying the superimposed image to displaying the pickup image on the image display.

5. A method of operating an imaging apparatus comprising:

picking up and obtaining a pickup image;

displaying, on an image display of the imaging apparatus, the pickup image;

receiving, via a touch panel of the imaging apparatus, a selection of a subject included in the displayed pickup image;

when the subject included in the pickup image displayed on the image display is selected via the touch panel, recognizing and chasing the selected subject in the pickup image;

switching, in accordance with an operation of a user via an operation input interface of the imaging apparatus, from displaying the pickup image to displaying a superimposed image including the pickup image and a cutout image which is cut out and generated for displaying a part of an area of the pickup image with magnification; and in a case that a position of the selected subject that is recognized and chased in the pickup image is changed, automatically changing the area which is cut out as the cutout image from the pickup image in accordance with the changed position of the selected subject in the pickup image;

when the superimposed image including the pickup image and the cutout image including the selected subject is displayed on the image display in accordance with the operation via the operation input interface and an operation of a start of recording of the pickup image for recording a moving picture is input via a recording button of the imaging apparatus, switching from displaying the superimposed image to displaying the pickup image on the image display.

6. The method according to claim 5, further comprising:

controlling, when an input of a manual focus operation is detected, a focus position of the pickup image, wherein the manual focus operation is the operation of the user input via the operation input interface that switches the display of the pickup image to the display of the superimposed image on the image display.

7. The method according to claim 5, further comprising:

when recording the pickup image as the moving picture, displaying the pickup image on the image display without switching to displaying the superimposed image during the recording when the operation is input via the operation input interface.

8. The method according to claim 5, further comprising:

operating in a control mode to recognize and chase a face of a person as the selected subject included in the pickup image displayed on the image display, wherein, in a case that a position of the face of the person that is recognized and chased in the pickup image is changed in the control mode, the area which is cut out from the pickup image as the cutout image is automatically changed in accordance with the changed position of the face of the person in the pickup image, and wherein, in the control mode, when the superimposed image including the pickup image and the cutout image including the selected subject is displayed on the image display in accordance with the operation via the operation input interface and the start of the recording by the recording button is detected, the display of the superimposed image is switched to the display of the pickup image on the image display.

\* \* \* \* \*